March 20, 1951 J. LOLLI ET AL 2,545,553

AUTOMATIC STATION SELECTING AND TUNING DEVICE FOR RADIO RECEIVERS

Filed Oct. 9, 1947 8 Sheets-Sheet 1

Inventors:
John Lolli
Gene Papitto
By Robert H. Wendt
Attorney

March 20, 1951 J. LOLLI ET AL 2,545,553

AUTOMATIC STATION SELECTING AND TUNING DEVICE FOR RADIO RECEIVERS

Filed Oct. 9, 1947 8 Sheets-Sheet 2

Inventors
John Lolli
Gene Papitto
By R H Wendt
attorney

Inventors
John Lolli
Gene Papitto
By R H Wendt
attorney

March 20, 1951 J. LOLLI ET AL 2,545,553

AUTOMATIC STATION SELECTING AND TUNING DEVICE FOR RADIO RECEIVERS

Filed Oct. 9, 1947 8 Sheets-Sheet 4

Inventors
John Lolli
Gene Papitto
By RH Wendt
Attorney

Inventors:
John Lolli
Gene Papitto
By R. H. Wendt
Attorney

Inventors
John Lolli
Gene Papillo
By R H Wendt
Attorney

March 20, 1951 J. LOLLI ET AL 2,545,553
AUTOMATIC STATION SELECTING AND TUNING DEVICE
FOR RADIO RECEIVERS Filed Oct. 9, 1947 8 Sheets-Sheet 7

Inventors.
John Lolli
Gene Papitto
By RH Wendt
attorney

March 20, 1951 J. LOLLI ET AL 2,545,553

AUTOMATIC STATION SELECTING AND TUNING DEVICE FOR RADIO RECEIVERS

Filed Oct. 9, 1947 8 Sheets-Sheet 8

Inventors
John Lolli
Gene Papitto
By R. A. West
Attorney

Patented Mar. 20, 1951

2,545,553

UNITED STATES PATENT OFFICE 2,545,553

AUTOMATIC STATION SELECTING AND TUNING DEVICE FOR RADIO RECEIVERS

John Lolli and Gene Papitto, Chicago Heights, Ill.

Application October 9, 1947, Serial No. 778,844

7 Claims. (Cl. 161—1)

The present invention relates to automatic selecting and tuning devices for radio receivers, and is particularly concerned with an improved commercial embodiment of the device shown in our prior application, Ser. No. 662,670, filed April 17, 1946 now Patent No. 2,501,472 dated March 21, 1950.

One of the objects of the invention is the provision of an improved station selector for home radio receivers by means of which the user may, while a station is broadcasting, or at any earlier time, so adjust the elements of the device that the radio receiver will be automatically tuned to the station or stations desired practically instantaneously at the time the adjustment is made or at some future selected time and so that the user may thereafter be provided with broadcast reception for every fifteen minute period of the day and night as he desires, without interruption.

Another object of the invention is the provision of an improved station selector and tuning device which is of more simple construction and more positive in its action and adapted to be manufactured at a lower cost than the device disclosed in our prior application.

Another object of the invention is the provision of an improved device of the class described which permits the user to utilize manual tuning whenever desired, and which also permits the user to utilize push button tuning at any time he may desire.

Another object of the invention is the provision of an improved mechanism of the class described including step-by-step means for moving the mechanism from its proper position for one fifteen minute period of time to the proper position for the next fifteen minute period of time, which mechanism positively holds the elements in the proper predetermined position, and which permits the change to be made practically instantaneously and exactly at the end of each fifteen minute period, with an accuracy within a few seconds.

Broadcasts are frequently prefaced by means of commercial broadcasts, which may also occupy a portion of the period near the end of the fifteen minute period, and thus a few seconds' variation in the time during which the mechanism switches from one station to another is not of the utmost importance; but it is important that the timing be as accurate as possible, as the commercial broadcast part may be very short, and no automatic station selector and tuning device which does not operate at substantially the exact beginning or end of a program would be satisfactory to the public.

Another object of the invention is the provision of an improved selector and tuning device for home receivers which is extremely simple, which can be manufactured at a very low cost, which is positive and exact in its operation, which permits the manual tuning by means of the usual rotating banks of condensers, but which does not employ any movable condensers that require exact adjustment, and which can be used for a long period of time without necessity for repair or replacement of any of its parts.

Another object of the invention is the provision of an improved timing device of the class described which may be easily adjusted to correct variations in the time setting of the clock, and which imposes no great strain upon the motor of the clock, and which is readily adaptable to be used with existing installations to be combined with and made of part of a radio receiver having the automatic timing and tuning mechanism built in the receiver.

Another object of the invention is the provision of an improved assembly in which all of the parts of the receiver and station selector and tuner may be mounted upon a suitable panel or bracket having a stable base portion and an upwardly extending portion for supporting these parts, and which may then be assembled as a unit with a suitable housing.

Another object of the invention is the provision of an improved form of actuating pin which is adapted to be held more securely and adapted to be constructed at a very low cost.

Other objects are the provision of a plurality of improved forms of step-by-step actuating devices which may be constructed at a lower cost than any of the devices of the prior art, and which are more positive in their action, moving from one time period to another quickly, and remaining accurately in predetermined position for each time period thereafter.

Other objects and advantages of the invention will be apparent from the following description and the accompanying drawings, in which similar characters of reference indicate similar parts throughout the several views.

Referring to the eight sheets of drawings.

Figure 1:
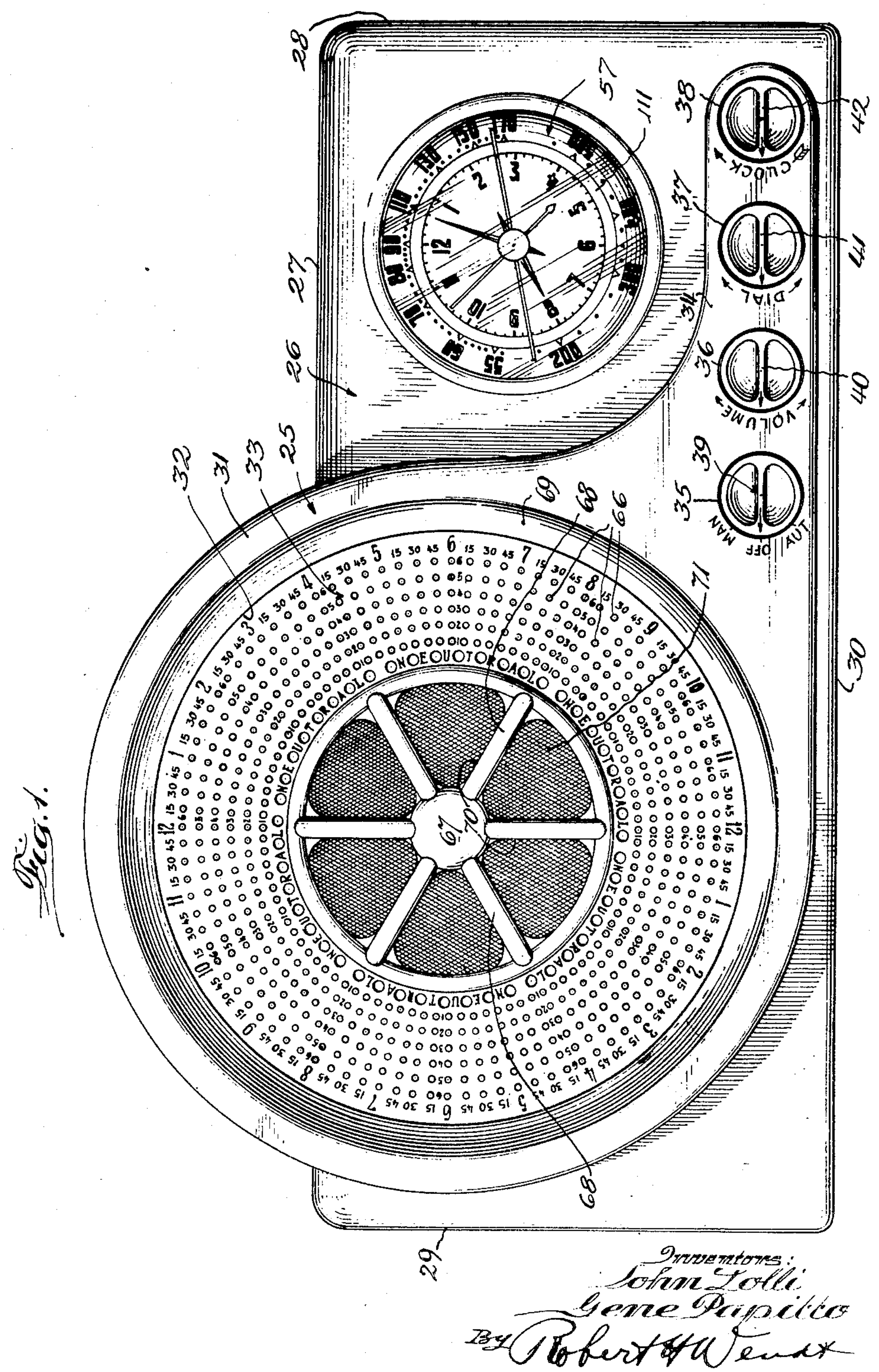
Fig. 1 is a front elevational view of a radio receiver with a timed automatic station selector and tuner embodying the invention.

Referring to Fig. 1, 25 indicates in its entirety the housing for the radio receiver and station selector and tuner. This housing is preferably molded out of a suitable molding material, such as a phenolic condensation compound or some suitable plastic.

The housing has a substantially rectangular portion 26, which is provided with a flat top 27, ends 28 and 29, and a flat bottom 30 serving as a base. Merged with the rectangular portion 26 of the housing there is a partially cylindrical forwardly projecting enlargement 31, which projects above the rectangular housing portion 26 and extends forwardly of it and is provided with a circular window opening 32 for exposing a rotatable station selector member 33.

The enlargement 31 also has a lateral extension 34, which projects forwardly of the rectangular housing portion 26 and is provided with the forwardly extending sleeves 35 to 38 surrounding and housing the control knobs 39 to 42. These control knobs are for the purpose of effecting the controls indicated by the legends, as follows.

Control knob 39 is the manual control switch having an off position, a position for manual control of the receiver dial, and a position for automatic control of the receiver dial.

The knob 40 connected to a rheostat for volume control is indicated by its legend. The knob 41 is connected to the adjustable condensers for adjustment of the tuning condensers. The knob 42 is for adjustment and setting of the clock, as indicated by its legend.

Figure 3:
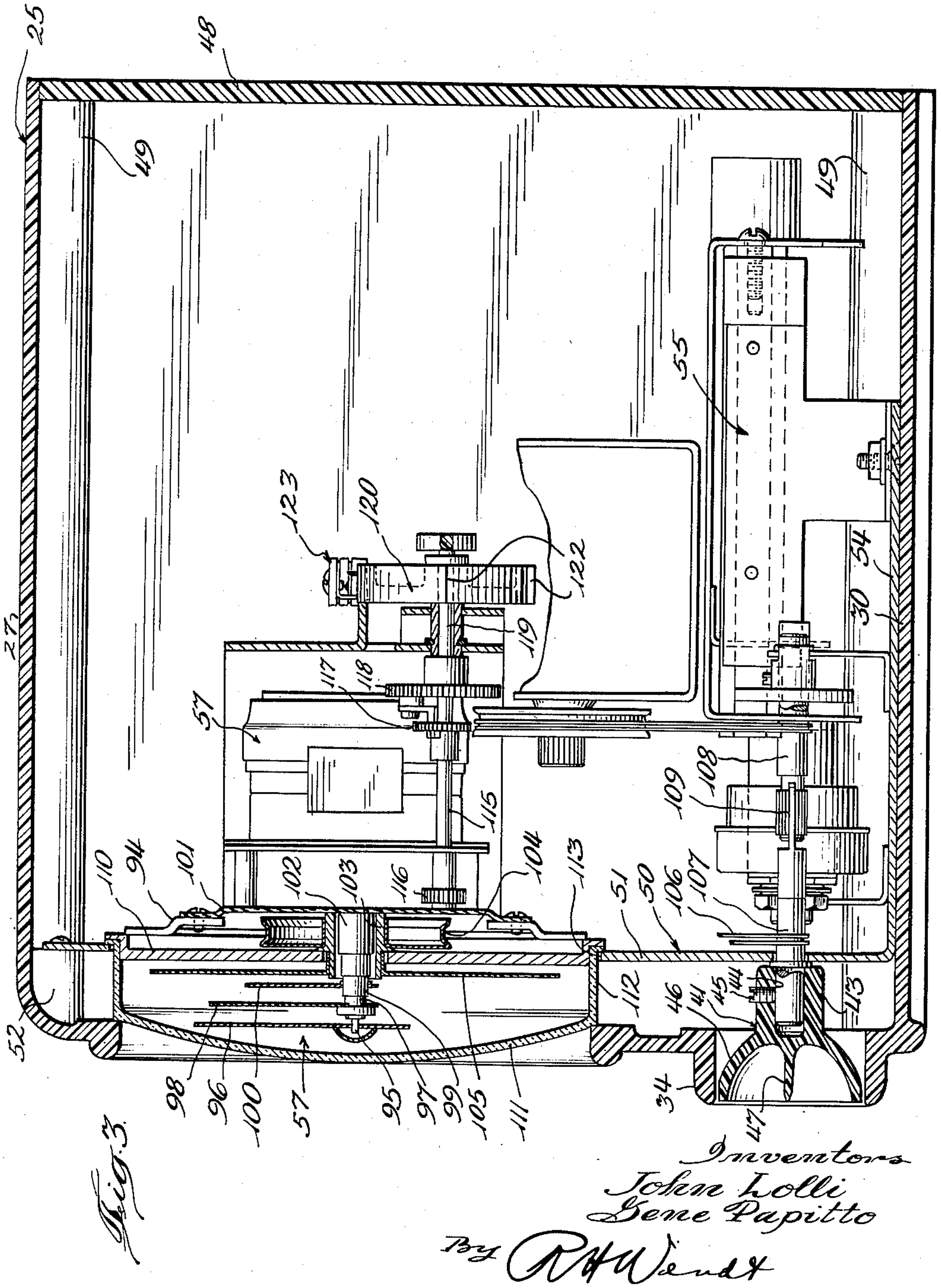
Fig. 3 is a vertical sectional view, taken on the plane of the line 3—3 of Fig. 2, showing the interconnecting mechanism between the receiver dial and the tuning knobs and the mechanism connecting the clock adjusting knob with the clock.

All of the knobs may be of similar construction, such as shown in Fig. 3, where the section is taken on the dial controlling knob 41. This knob is preferably a molded insulating member made with a cylindrical hub 43, having a cylindrical socket 44 and set screw 45 for attachment to a shaft. The hub 43 supports an integral forwardly projecting half spherical member 46, which is hollow and provided with a forwardly projecting diametrical rib 47.

This leaves sufficient space for the operator to insert this thumb and forefinger, grasping the rib 47 for positive actuation of the knob.

Another advantage of this type of knob is that its edge is flush with the ends of the sleeves on the cabinet, and these sleeves protect the knobs against shocks or blows so that there are no projecting knobs which are apt to be damaged during use or shipment.

Figure 2:
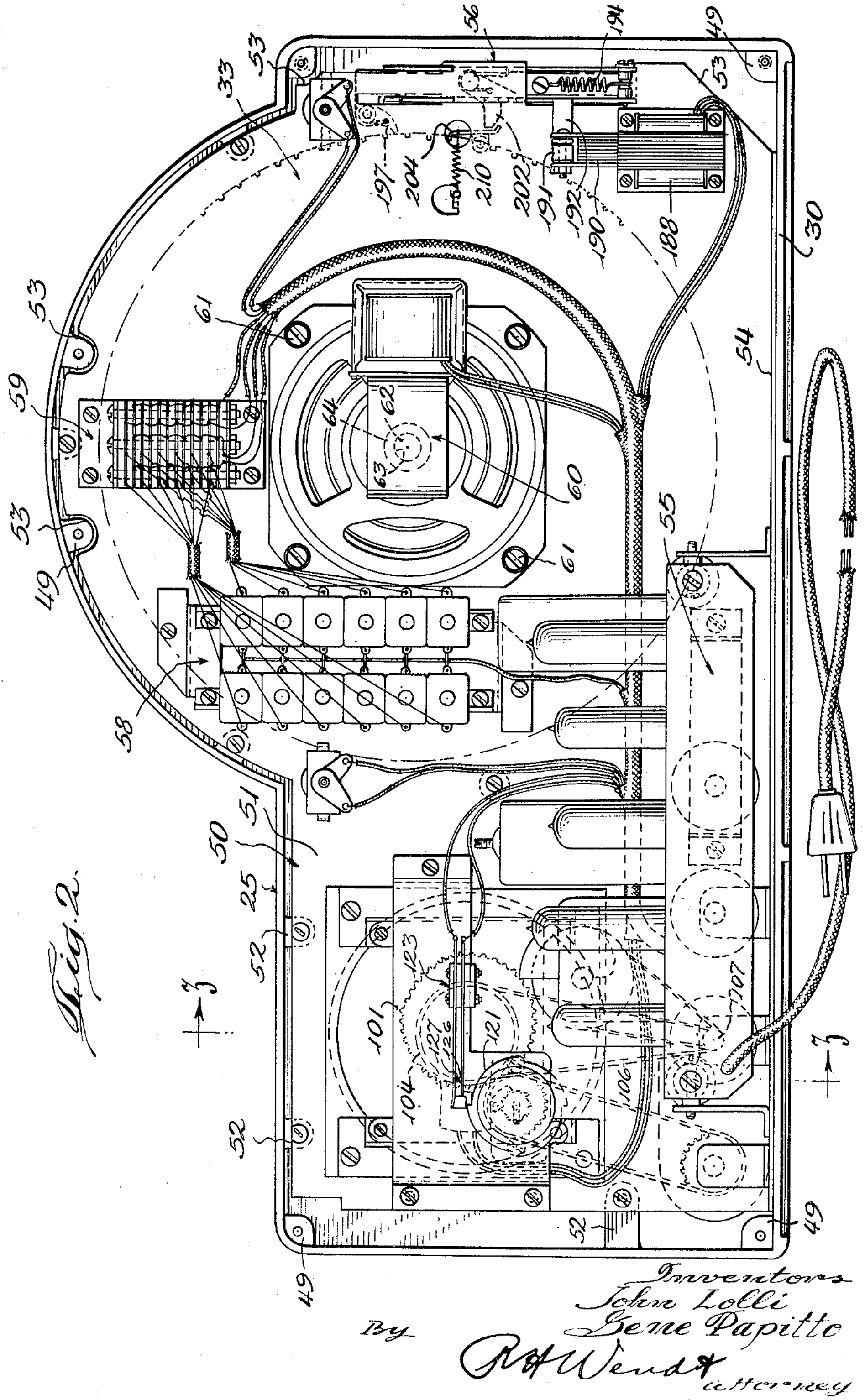
Fig. 2 is a rear elevational view of the assembly showing all of the parts in their relative positions.

The housing 25 is open at its rear end and may be closed by means of a back member 48 of the same molded insulating material and of the same shape as the rear opening in the housing, as shown in Fig. 2, and is secured by means of self-threading screws, which are threaded into inwardly projecting lugs 49 carried by the walls of the housing.

The lugs 49 are preferably continuous from the front to the back of the housing, and are located in the four corners thereof so that they may be molded on the inside of the housing and tapered to permit withdrawal of the core of the mold. All of the parts of the mechanism are preferably mounted upon a supporting bracket, indicated in its entirety in Fig. 2 by the number 50. This bracket may be substantially complementary in shape, but slightly smaller than the inside of the housing 25.

The bracket has a vertical flange or mounting panel 51, which is received inside the housing in a vertical position, and which engages inwardly extending lugs 52 carried by the top and side walls, whereby screws may pass through the panel 51 into the lugs 52 to secure the mechanism and the housing together.

The vertical panel 51 of the bracket 50 is cut away or recessed wherever necessary, such as the points 53 (Fig. 2) to clear the lugs 49 which are carried by the inside of the housing for supporting the rear cover plate 48.

The vertical panel 51 of the bracket 50 is carried by a base plate 54, extending at right angles to the vertical panel 51 and adapted to rest upon the bottom wall 30 when the mechanism is inserted in the housing.

Base plate 54 also serves to support parts of the mechanism, such as the radio receiver chassis 55. The radio receiver may be of any suitable type; but to explain the invention, a type is shown which includes a audio frequency stage and a radio frequency stage.

Referring now to Fig. 2, the general parts of the mechanism will now be described. In addition to the radio receiver chassis 55, the bracket 50 supports the station selector member 33 on its vertical panel 51. It also supports a step-by-step actuating mechanism 56 and the clock mechanism 57 (Fig. 3). It also supports an assembly of trimmer condensers 58 (Fig. 2) and an assembly of control switches 59 (Fig. 2) and the speaker 60.

The speaker 60 may be of any desired type, and it is supported upon the vertical panel 51 by means of a plurality of screw bolts 61 arranged at the corners of the speaker and threaded into the vertical planel 51.

The vertical panel 51 supports the station selector 33 on the forward side of the panel in position to be exposed and be concentric with the window opening 32, the selector member 33 being carried by a centrally located shaft 62 secured to the panel 51 and passing through a bearing bore 63 in a bearing 64 carried by the station selector 33.

The station selector 33 comprises a circular member of insulating material, such as a suitable plastic provided at its center with the bearing member 64 for its rotatable support and of a size slightly larger than the window opening 32.

The station selector member should be of substantial thickness so as to give extended engagement and support to the shanks of the switch actuating pins 65 which pass through apertures 66 in the station selector 33 and are fixedly supported by said selector.

The station selector is provided at its center with a wheel formation comprising the hub 67 and a plurality of radially extending spokes 68 integrally secured to a rim 69. The spokes are separated by open spaces 70, which are covered with a suitable cloth or screen 71 for transmission of the sound from the speaker and for concealing the mechanism of the speaker.

The vertical panel 51 of the bracket 50 also has similar spokes 68 and apertures 70 for passage of the sound from the speaker through the vertical panel 51. The station selector 33 is provided with a multiplicity of the apertures 66, these apertures being located on radial lines and on circles which have for their center the center of the shaft 62.

The periphery of the station selector member 33 is divided up into twenty-four equal spaces, indicating the twenty-four hours of the day; and these peripheral spaces are provided with numerical indicia from one to twelve for the day and night hours. Each hour space is further divided into three additional one-quarter hour positions which are indicated by 15, 30, and 45; and the radial series of holes are in alignment with the indicia so as to indicate the hourly position, the quarter hour position, the half hour position, and the three-quarter hour position.

Thus there is a series of radially located holes in the station selector for each hour and for each quarter hour between the hours.

The number of circles of apertures in the station selector depends on the number of stations sought to be controlled. In the present example there are six stations, which may be six of the principal stations for which the receiver is to be used. There are, however, seven apertures, the seventh and innermost one being a neutral position in which a supported pin will strike no switches whatever.

Thus the innermost row of apertures supports the pins in Fig. 1 and bears the indicia "Neutral" between the heads of the pins. The pins 65 are preferably made of some suitable metal, such as steel; and they are provided with a cylindrical shank 72 and a tapered or frustoconical end 73. The shank 72 carries a cylindrical knurled enlargement or head 74 with an annular shoulder 75 that engages the front of the station selector 33.

Intermediate its ends the pin shank 72 has a reduced cylindrical portion 76 which may carry a split sleeve spring 77. This spring may be made of suitable spring steel, and it comprises a cylindrical sleeve which is split at 78 from end to end.

In addition, there are a multiplicity of longitudinally extending short slots 79 which terminate short of the ends; and the central portions 80 between the slots 79 are caused to bulge outward by an upsetting operation, such as the application of force to the ends of the spring, which compresses the spring longitudinally and bulges the spring portions outward. Such a spring 77 may be opened far enough at the slot 78 to be sprung on the reduced portion 76 of the shank, where it will close into the position of Fig. 12.

When so constructed, the spring 77 projects at its bulges 80 far enough to engage frictionally the inside of each bore 66.

The shank 72 has a close sliding fit in the bore 66 and engages the bore 66 adjacent its ends. Thus any pin is frictionally held in the bore by the springs 77; but it also has firm engagement by the shank 72 and the pins 65 are supported firmly so that they can actuate the control switches.

Each control switch preferably has an insulating block 77′ on its lower side, and the block 77′ is beveled forwardly at 78′ and at 79′. The forward bevel 78′ is engaged by the tapered or conical end portion 73 of a pin 65. Thus a pin may be inserted at any time to engage the bevel 78′ of a switch to actuate the switch from the front end of the switch arm.

The pins 65 may thus act as push-pull actuating members, a push closing a switch and a pull or removal of the pin opening the switch.

The cylindrical shanks 72 of the pins 65 also serve to engage the beveled portions 79′ of the insulating blocks 77′ so that the pins may actuate and cam the switch arms upward by engagement with the beveled portions 79′ when the pins move in a peripheral direction due to the rotation of the station selector 33.

Then the pins move until they pass off the bevel 79′ and are located under the flat bottom portions 80′ of the insulating blocks so that the pins which are so engaged hold the switches in closed position. Each insulating block 77′ has its camming extension 81 with the beveled surfaces 78′ and 79′ located forwardly of an elongated body 82 which is fixedly secured to three leaf springs 83, 84, 85. Thus a single pin may actuate three separately insulated switches to make or break the circuit from the source of energy and the circuit for the audio stage, as well as the circuit for the radio frequency stage.

Figures 8, 9, 10, 11, 12:
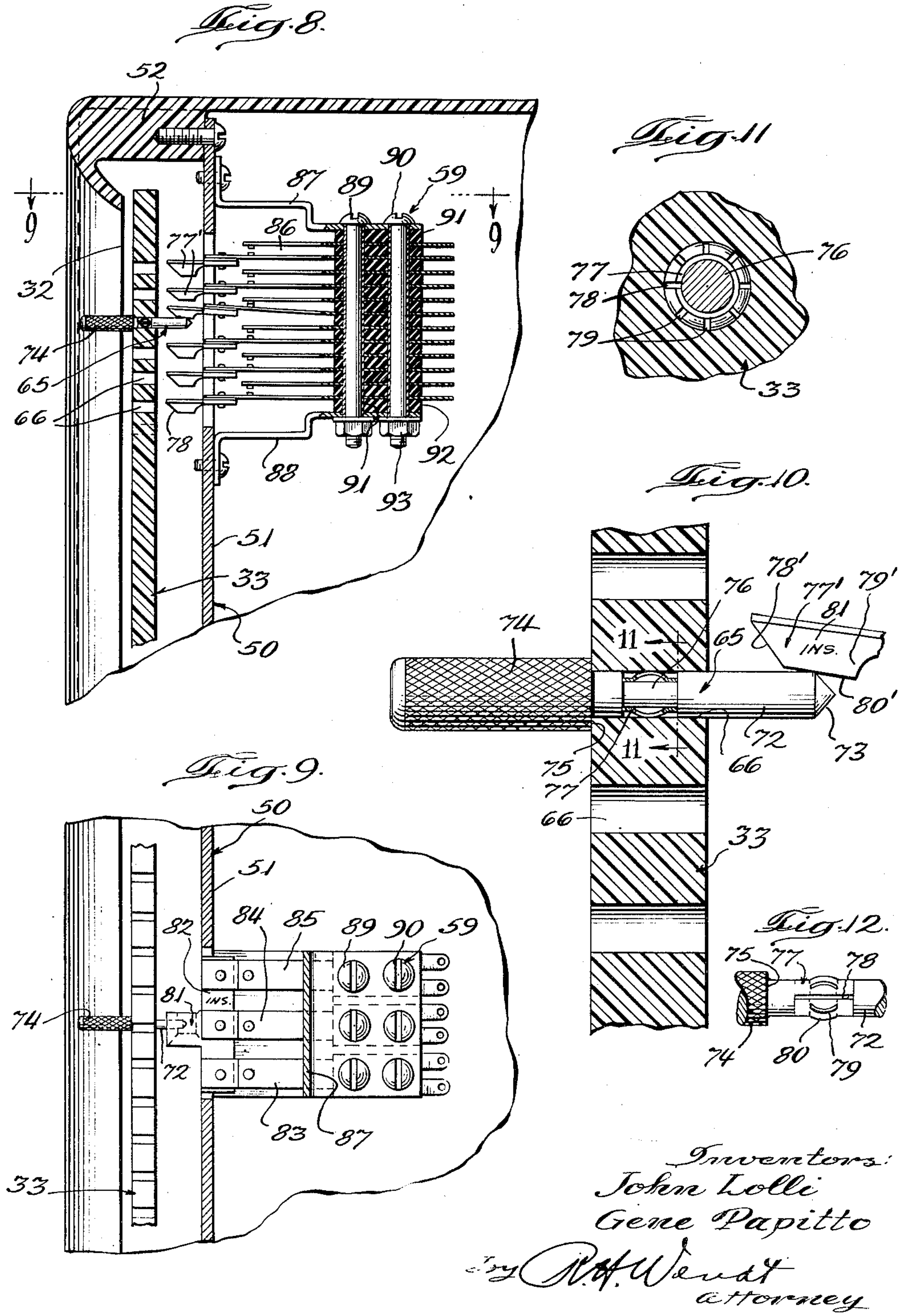
Fig. 8 is a fragmentary vertical sectional view taken through an upper portion of the cabinet, showing the station selector and the bank of switches which actuates and controls the tuning of the receiver.
Fig. 9 is a fragmentary top plan view of the subject-matter of Fig. 8, taken on the plane of the line 9—9 of Fig. 8.
Fig. 10 is an enlarged sectional view, taken on the same plane as Fig. 8, showing the structure of one of the switch actuating pins and its mode of support by the rotatable station selector.
Fig. 11 is a fragmentary sectional view, taken on the plane of the line 11—11 of Fig. 10.
Fig. 12 is a fragmentary elevational view of a portion of the switch actuating pin, showing the spring which holds the pin firmly in the station selector member.

Each switch unit thus includes six spring members bearing contacts at their ends; and the other spring members, which are located above the contact springs 83 to 85, may all be indicated by the numeral 86 (Fig. 8).

Since there are six stations to be controlled, there will be six of the three spring assemblies shown in Fig. 9, each opposed by three of the springs 86 located immediately above and in position so that the contacts will come into engagement with each other.

Such an assembly of spring switches may be supported upon a pair of sheet metal brackets 87, 88, which are carried by the panel 51, and which in turn carry a pair of screw bolts 89 and 90. Each screw bolt has an insulating sleeve 91 to insulate it from the springs 83–86; and each spring is separated from the spring above it and from the brackets 87, 88 by an apertured insulating block 92.

Thus all of the springs may be insulated from each other and clamped together by the same bolts 89, 90 provided with nuts 93. The spring assembly 59 may be located anywhere adjacent the periphery of the station selector 33, but is preferably located at the top so that the operator may understand that when the pins reach the top position they are in the switch actuating position.

The panel 51 also supports the clock 57, which may be secured to the panel by means of suitable brackets 94. The clock 57 preferably has a plurality of concentric shafts. The innermost shaft 95 suports the sweep second hand 96. The next tubular concentric shaft 97 supports the minute hand 98 (Fig. 3). The next concentric shaft 99 supports the hour hand 100.

The brackets 94 support a plate 101, which carries a trunnion member 102 surrounding the clock shafts, and the trunnion member 102 rotatably supports a sleeve 103. Sleeve 103 may carry a suitable pulley 104, and at its inner end it carries the double dial pointer 105.

The pulley 104 is connected by means of suitable belts 106, with a shaft 107 supporting the knob 41 for dial movement. The shaft 104 is connected to the tuning dial shaft 108 by means of a suitable flexible coupling 109. Thus, when the radio receiver is tuned, the double dial pointer 105 will be rotated by means of the pulley 104, belt 106, shaft 107, to indicate the wave length to which it is tuned, there being suitable indicia upon the dial plate 110.

All of the pointers are preferably enclosed by means of a suitable transparent cover member 111, which has a cylindrical flange 112 housed in an aperture 113 in the panel 51.

All of the knobs 39–42 are connected by means of shaft extensions and universal connections similar to 108 and 109 to the respective devices which they control, such as, for example, the volume control and the switch for "on" or "off," "manual" or "automatic" control.

The clock unit 57 is preferably an electric synchronous clock; and it is provided with an outside drive shaft 115 from the clock mechanism through gear 116; and this shaft is provided with suitable gearing connections 117, 118 to a cam shaft 119, whereby the cam shaft is rotated once in each hour.

The cam shaft 119 bears at its end a cam 120 comprising a wheel, the periphery of which is provided with four camming surfaces 121 of gradually increasing radius and with a drop at 122, the shoulders 122 being ninety degrees apart on the cam.

The cam 120 is adapted to actuate and control a switch unit 123 provided with a pair of resilient switch arms 124, 125 and with a pair of contacts 126, 127. The resilient switch arms 124, 125 are provided with cam followers 128 and 129, which may comprise metal angle members or integral downwardly extending flanges.

Figures 5, 7:
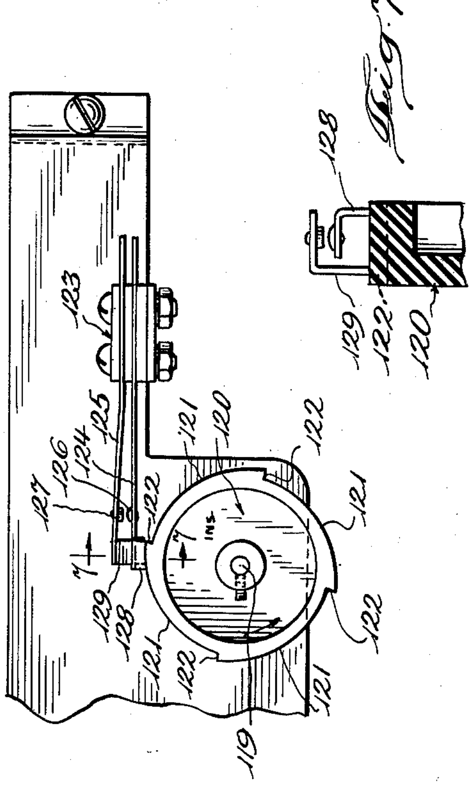
Fig. 5 is a fragmentary elevational view showing a clock actuated cam and the switch structure for making a momentary contact by means of which a solenoid is energized and the station selector may be rotated step by step.
Fig. 7 is a fragmentary end elevational view showing the parts of the switch arms which ride upon the cam.

The flange 128 is shorter than the flange 129; and assuming the cam to be rotating counterclockwise, the flange 128 is located farther to the left in Fig. 5 than the flange 129. The length of the flanges in a radial direction with respect to the cam 120 is such that when they are both riding on a camming surface, the contacts 126, 127 are open, as shown in Fig. 7. As the cam rotates counterclockwise in Fig. 5, it will be seen that the contacts are open.

Figure 6:
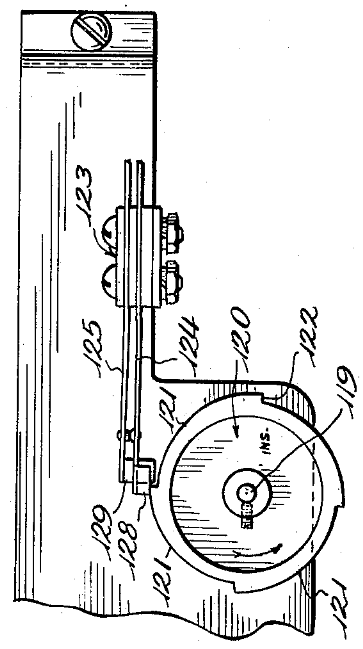
Fig. 6 is a view similar to Fig. 5, with the parts shown in the closed circuit position.

The flange 129 first reaches the drop 122, as shown in Fig. 6, and permits the spring 125 to move downward to the position of Fig. 6, closing the contacts. At this time the flange 128 is still on the dwell 121 above the drop 122. A moment later, however, the flange 128 passes off the drop 122, and both flanges 128, 129 again ride upon the dwell 121 at the same elevation, opening the contacts 126, 217.

Thus the cam 120 and switch unit 123 are adapted to close the contacts 127, 126 only momentarily; and this circuit closure is effected once every quarter hour, on the hour, and at the end of every fifteen minute period.

Figures 13, 14, 15:
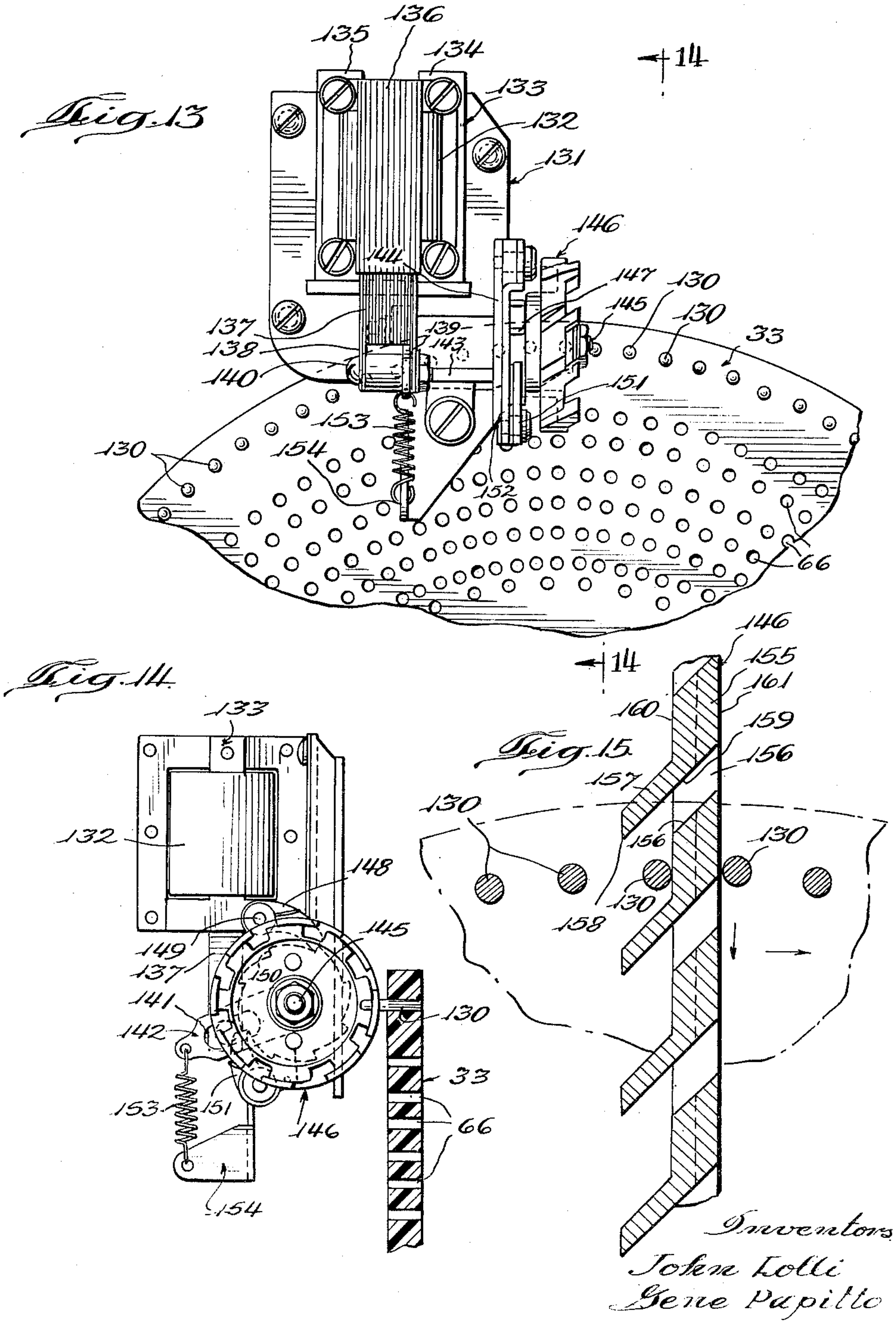
Fig. 13 is a fragmentary elevational view of one of the magnetic step-by-step actuating devices for the station selector member.
Fig. 14 is a fragmentary side elevational view, with the station selector member in section, taken on the plane of the line 14—14 of Fig. 13.
Fig. 15 is a developed view of the camming member, showing its relation to the pins carried by the station selector by means of which the station selector is moved step-by-step by the devices of Figs. 13 and 14.

The station selector member 33 is preferably actuated step by step by an electrical mechanism which is controlled by the switch unit. Such a step-by-step mechanism is shown in Figs. 13, 14, and 15. In this case the station selector member 33 is provided with a multiplicity of axially projecting pins 130, which are located adjacent its periphery and which project rearwardly, assuming that the magnetic unit 131 is located on the rear side of the station selector member 33.

The magnetic unit 131 comprises an energizing coil 132 mounted upon a magnetic core unit 133. The core unit is provided with a pair of U-shaped members of magnetic metal 134, 135, these members having their legs oppositely disposed toward a central nonmagnetic tube 136 for receiving the movable armature core 137.

The movable armature core is drawn into the coil 132 when the coil is energized momentarily by means of switch unit 123. This core may be constructed of a plurality of laminations; and the outermost laminations 138, 139 may be extended beyond the body of the core, forming pivot flanges for receiving the pivot bolt 140.

The pivot bolt 140 engages in a slot 141 in a ratchet arm 142. The ratchet arm 142 is of substantially U shape, being provided with a laterally extending yoke 143 and with another parallel leg 144, which is pivotally mounted upon a shaft or bolt 145. The bolt 145 supports a combined ratchet wheel and cam wheel 146. This ratchet wheel 146 is provided with the ratchet shoulders 147, whereby the cam 146 may be actuated. A holding pawl 148 (Fig. 14) is pivotally mounted at 149 and spring pressed toward the ratchet wheel 146 to hold it against reverse movement by engagement with one of the shoulders 150 (Fig. 14).

Another pawl 151 is carried by a radially projecting plate 152 which is actuated by the U-shaped member 142, and the other end attached to a bracket 154.

Each time the solenoid core 137 is drawn inward, the pawl 151 engages shoulders 150 on the ratchet wheel and moves the combined ratchet wheel and cam 146 one step in a rotative direction clockwise in Fig. 14. Each time the solenoid coil 132 is deenergized the spring 153 drives the core 137 outward; that is, downward in Figs. 13 and 14; and the driving pawl 151 steps backward to take a new bite against a new shoulder 150.

The cam 146 has a peripheral flange 155, which is provided with a plurality of slots 156 extending diagonally at forty-five degrees to the axis of the bolt 145. The slots 156 are wide enough to pass the pins 130.

One of the walls of the slots 156 is provided with an axially and diagonally extending extension flange 157. The length of the flange 157 is such that when one of the pins 130 enters the slot 156 the tip 158 of the flange 157 has already passed over the next pin 130.

As the cam 146 rotates downward in the direction of the arrow in Fig. 15, the pin 130, which is at its left in Fig. 15, passes upward into the slot 156. The camming surface 159 then cams the pin 130 toward the right in Fig. 15 until it passes out of the top of the slot 156. Thereupon the cam wheel 146 continues to rotate until the flat sides 160 and 161 are located between two pins 130, 130.

Thus it will be seen that the cam wheel 146 is adapted to be located between the pins 130 when it is in the position of Fig. 15. In this position the cam wheel 146 positively holds the station selector in a position which corresponds with the closure of a certain series of switches of the switch unit 59 (Fig. 8).

At this time one of the pins 65 is engaging one of the insulating blocks 77 and actuating three of the switches, as shown in Fig. 9. Each time the cam wheel 146 is actuated a step in a rotative direction, the station selector 33 is moved rotatively one step from one of the pins 130 to the next pin 130.

The pins 130 are located on a line with the apertures 66, and thus the present magnetic unit 131 is adapted to move the station selector and rotate it one step each time the solenoid 132 is energized.

Figure 16:
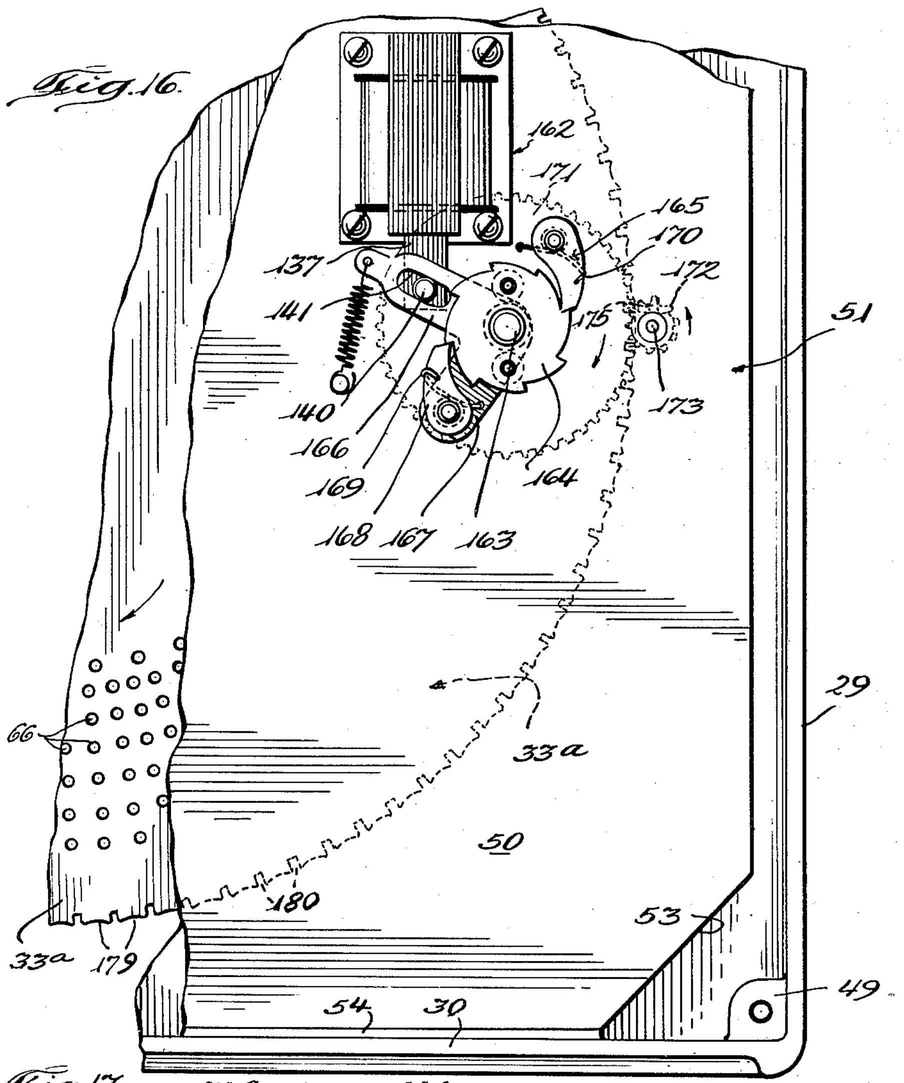
Fig. 16 is a fragmentary elevational view, showing a magnetic step-by-step actuating device for the station selector, employing a Geneva movement.
Figure 17:
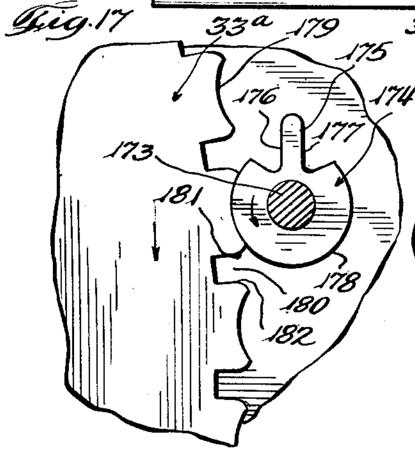
Fig. 17 is an enlarged fragmentary view, similar to Fig. 16, showing the Geneva movement employed.
Figure 18:
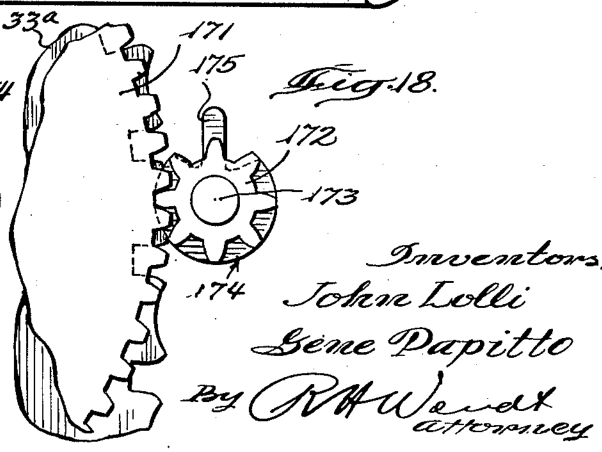
Fig. 18 is a fragmentary rear elevational view, showing the gear and Geneva movement of Fig. 16 on a larger scale.

Referring to Figs. 16, 17 and 18, these illustrate another step-by-step mechanism for the station selector. In this case the support for the magnetic unit 162 is provided with a bracket for supporting a shaft 163. The shaft 163 carries a ratchet wheel 164; and the fixed support carries a holding pawl 165 spring pressed toward the ratchet wheel 164.

The solenoid core 137 has a pin 140 engaging in a slot 141 in a bellcrank lever 166. The bellcrank lever is pivoted on the shaft 163 and has its other arm 167 provided with a driving pawl 168 for urging the ratchet wheel 164. Springs 169 and 170 urge the pawls 165 and 168 into engagement with the ratchet wheels.

The shaft 163 also carries a gear 171, and the gear 171 actuates a pinion 172 carried by vertical panel 51. The pinion 172 is mounted on the shaft 173, which also carries the Geneva movement member 174 (Fig. 17). Such a Geneva movement member has a single tooth 175 with tooth spaces 176, 177 on each side of the tooth 175.

The rest of the periphery of the Geneva driving member 174 is circular or cylindrical, as indicated at 178. The Geneva driving member 174 is located adjacent the periphery of a different form of station selector 33*a*. This station selector has its periphery formed with inwardly curved cylindrical portions 179 spaced by slots 180.

The walls 181, 182 of the slots 180 are adapted to receive the tooth 175. In this case each time the ratchet wheel 164 is turned one step, the Geneva driving member 174 makes one revolution. When it makes a revolution, the tooth 175 engages in a slot 180 and drives the station selector 33*a* one step. The continued rotation of the Geneva driving member 174 brings it again to the position of Fig. 17, where its curved periphery 178 is locked in a concavely curved edge portion 179 of the station selector 33*a*.

Thus this step-by-step mechanism holds the station selector 33*a* in fixed position, with certain control switches of the unit 59 closed; and at the end of each fifteen minute period the station selector 33*a* is moved one step, to the next position.

Figures 19, 20:
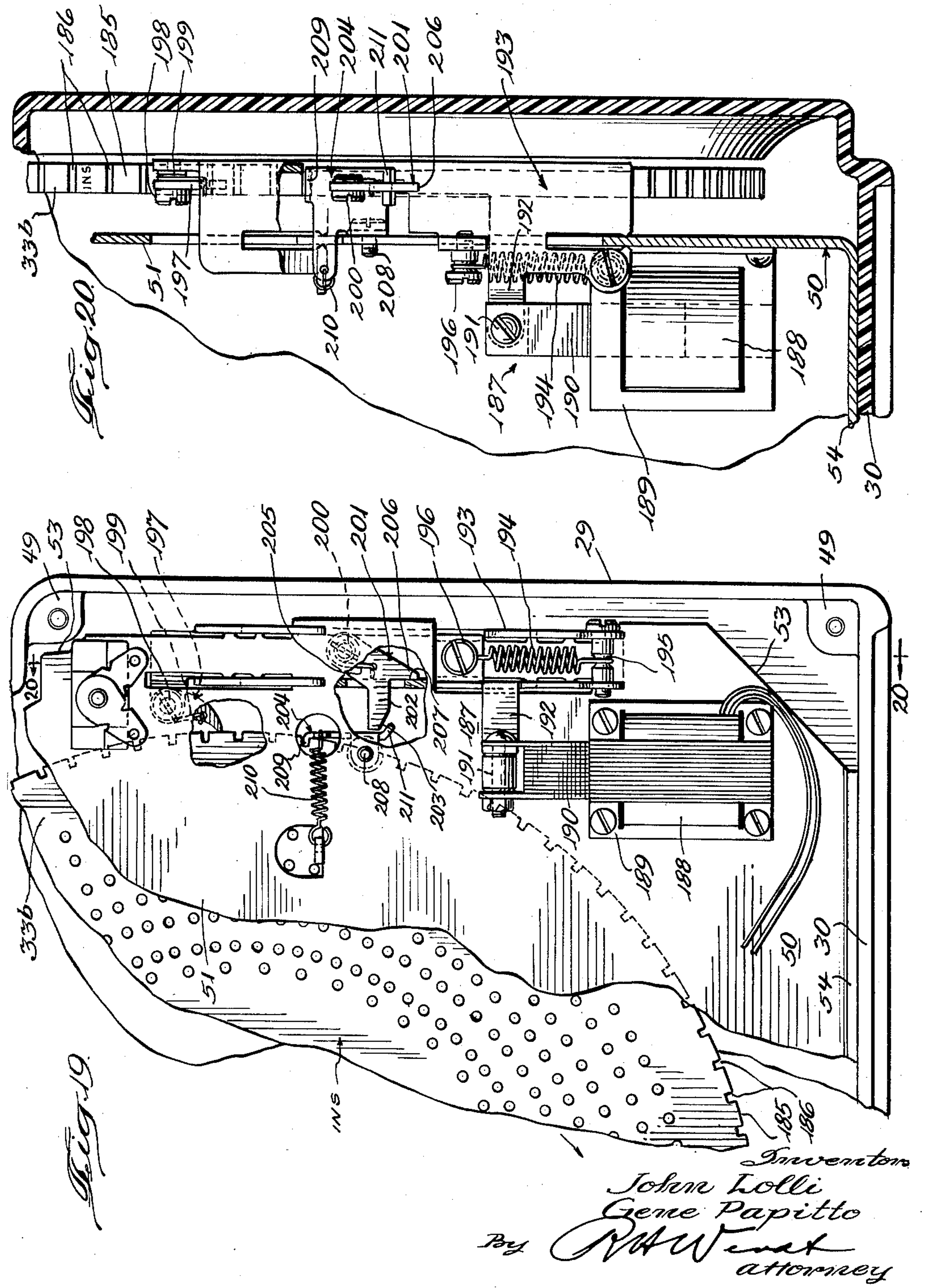
Fig. 19 is a fragmentary sectional view of another step-by-step mechanism, shown with parts of the cabinet broken away to disclose the details of the mechanism.
Fig. 20 is a vertical sectional view, taken on the plane of the line 20—20 of Fig. 19, looking in the direction of the arrows.

Referring to Figs. 19 and 20, these views show another type of step-by-step actuating mechanism for actuating a station selector 33*b*. The station selector here differs from the others only in the fact that its periphery 185 has a regular circular contour provided with a plurality of regularly spaced rectangular slots 186.

The step-by-step mechanism, indicated in its entirety by the numeral 187, includes a solenoid coil 188, magnetic core 189, and a plunger armature 190. The plunger armature is pivotally connected by bolt 191 to the laterally projecting arm 192 of a slider 193.

The slider 193 is urged upward by spring 194, which has one end attached to the slider at 195 and the other attached to the frame or guide at 196. At its upper end the slider 193 carries a spring pressed driving pawl 197, which is pivotally mounted on the slider at 198 and provided with a spring 199 that urges the point of the pawl 197 against the cylindrical periphery of the selector member 33*b*, or into the slots 186.

Intermediate its ends the slider 193 has pivotally mounted upon it, by means of the bolt 200, a pawl release 201. This pawl release has a laterally projecting arm 202 with a beveled camming portion 203 for engaging and actuating a holding pawl 204.

A spring 205 urges the pawl release member 201 into the position shown in Fig. 19, with its stop extension 206 engaging the stop surface 207. The holding pawl 204 is mounted upon the supporting panel by means of a bolt 208. This holding pawl 204 has a laterally turned end 209, which engages in the slots 186 and holds the station selector 33*b* fixedly in any of its positions, to which it is moved step by step.

A spring 210 urges the end 209 of the pawl 204 toward the slots 186. At its other end, beyond the pivot 208, the holding pawl 204 has a diagonally extending actuating portion 211. This diagonal portion 211 is in the path of the beveled surface 203 on the laterally projecting arm 202 of the holding pawl release member 201.

The operation of this step-by-step mechanism is as follows: When the circuit is momentarily closed through the solenoid coil 188, plunger 190 is pulled downward, pulling with it the slider 193. At this time the holding pawl 204 is holding the station selector 33*b* in a predetermined position, as shown in Fig. 19, by means of the bent end 209, being in a slot 186.

The driving pawl 197 is riding on a cylindrical periphery 185 of the station selector 33*b*. The relation of the parts is such that arm 202 engages the diagonal end 211 of the holding pawl 204 first, causing the holding pawl 204 to pivot clockwise and to remove the holding end 209 from the slot 186.

While it is so held, the driving pawl 197 has progressed far enough to drop into a slot 186; and further downward movement of the slider 193 causes the driving pawl to move the station selector 33*b* clockwise in Fig. 19. While this movement is taking place, the end 209 is in position to ride on a cylindrical portion 185 of the station selector 33b.

Next in the cycle of events, the beveled end 203 of arm 202 snaps over and off the diagonal end 211 of the holding pawl 204. The holding pawl is urged back toward the periphery of the station selector 33b; but it cannot snap into the next slot until the driving pawl 197 has moved the station selector 33b one full step forward in a clockwise direction.

When the pawl has moved the station selector a full step, the end 209 of the holding pawl 204 snaps into the next slot, above the one in which it is seen in Fig. 19, and terminates the stroke of the plunger armature 190 and slider 193.

The actuation of the plunger being momentary, since the coil 188 is de-energized, the spring 194 again raises the slider 193 and plunger 190 to the position of Fig. 19. During this movement the driving pawl 197 moves out of the groove which it has been using to actuate the station selector, and the holding pawl release member 201 is pivoted counterclockwise by its engagement with the end 211 against the spring 205 until it snaps again into position above the end 211, as shown in Fig. 19.

The mechanism is then again ready for the next actuation or step-by-step movement, and the station selector has been moved one definite step, equivalent to fifteen minutes; but it is held definitely in this position, to actuate certain switches throughout the period of fifteen minutes.

Figure 4:
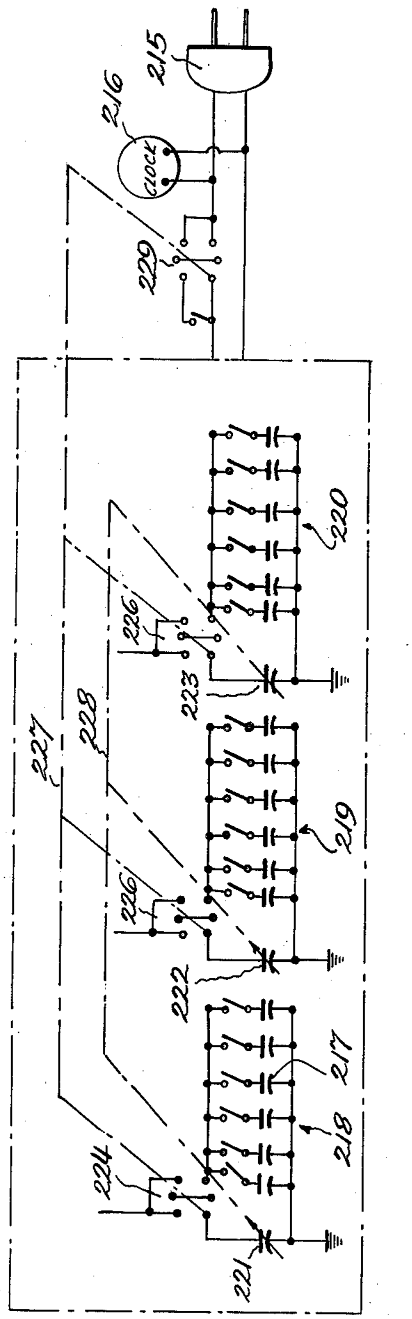
Fig. 4 is a wiring diagram showing the circuits employed.

Referring now to Fig. 4, this is a wiring diagram for the electrical circuits. 215 indicates the plug, which may be connected to 110 volt, 60 cycle alternating current supply. 216 indicates the clock motor, which will be continuously energized. The trimmer condensers 217 are arranged in groups 218, 219, 220. There are six trimmer condensers in each group to correspond to the six stations.

The rotatable condensers are indicated at 221, 222, 223; and there is one of these shown for each stage. The double throw switches 224, 225, 226 may be simultaneously actuated, as indicated by the dot-dash line actuating member 227, to open the circuit or to connect it with the ordinary manually adjustable condensers 221—223, or to connect the circuit in all three stages with the trimmer condenser groups 218—220.

When the knob 39 is turned, it actuates all of the switches 224—226, and may connect them for manual tuning, automatic tuning, or disconnect them, as indicated in the "off" position of Fig. 1.

The dial knob 41 actuates all of the adjustable condensers 221–223 simultaneously by means of connecting mechanism 228, indicated in dot-dash lines; and is used for manual tuning.

The volume control knob 40 is used for adjusting the volume, and is connected to the ordinary volume control devices, such as a rheostat, in the radio receiver.

The clock knob 42 is connected through suitable bolts and driving mechanism to the hands of the clock so that it may be used to adjust and set the clock hands to proper time. The additional switch 229, which controls the whole circuit is adapted to effect a complete de-energization of the receiver or to switch it to a closed circuit for manual or automatic tuning.

The operation of the present device is as follows: The station selector is provided with one of the pins, illustrated in Figs. 8–12 for each fifteen minute period. When it is not desired to use the receiver for any fifteen minute period, the corresponding pins are located in the holes in the innermost circle, where the letters "Neutral" appear between the holes.

In this position the pins clear all switches, and have no effect.

Whenever the user wishes to select a station by means of the station selector 33 for any particular period of time, he inserts the pin in the hole of a radial series of six holes, which hole corresponds to the station in question. Six selections are permitted.

Thus pins may be inserted for the first station at, for example, one o'clock, by placing a pin on a radial line, with one in the first circle holes. In a corresponding manner other pins may be placed to select stations for any period of time throughout the night or day.

When manual tuning is desired, the knob 39 may be turned to the manual position. If automatic tuning is desired, it should be turned to the automatic position. As the station selector rotates step by step, it is the uppermost series of holes which are in registry with the switch units 59.

Thus these holes may be used by inserting pins for push button selection. A pin which is inserted in one of these uppermost holes cams against the end beveled surface 78 and actuates a series of three switches simultaneously to select that station.

Assuming that the operator wishes to preselect the stations and has done so by inserting pins in suitable holes for suitable times; when the device is energized, the clock operates continuously and indicates the time on its dial. The same dial would also indicate manual tuning.

Assuming that the switch is turned for automatic tuning, then the circuits are so energized that as the cam 120 is rotated by the clock, the solenoid of the step-by-step mechanism is energized at the end of every fifteen minutes. When the solenoid is energized, it steps the station selector around clockwise one step and brings the pin, which is then uppermost, into engagement with the beveled side surface 79 of the corresponding switch unit, closing the switches in the manner shown with regard to the third switch from the top in Fig. 8.

This connects predetermined trimmer condensers in all three stages; and the trimmer condensers are so adjusted as to their capacity that they effect a tuning of these three stages for the particular station in question. Thus the selector has connected proper switches in circuit to select and tune the receiver for the station selected.

The present mechanism holds the station selector positively in this position throughout the fifteen minute period. At the end of each fifteen minute period the station selector is again stepped around one step, and the same or a new station is selected and tuned automatically.

It will thus be observed that we have invented an improved mechanism for automatically selecting and tuning pre-selected stations. The present mechanism is an improvement over our prior application, Ser. No. 662,670, filed April 17, 1946, for Automatic Station Selecting and Tuning Devices for Radio Receivers; and the mechanism shown in this application relates to the commercial embodiment of the invention.

This commercial embodiment has been particularly developed for the purpose of reducing the cost of construction and for assuring positive and certain actuation and tuning at a minimum cost. The mounting of all of the mechanism upon a base 54 with an upright panel 51 permits all of the parts to be suitably adjusted and assembled, and then inserted in the housing with a minimum amount of labor.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements, the said support comprising a metal member having a vertical flange supporting the trimmer condensers, switches, speaker, and station selector, and having a wide stable horizontal flange supporting the radio receiver so that the mechanism may be mounted upon said support for insertion into a housing as a unit.

2. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements, the said station selector comprising a thick insulating member having a central hub and bearing for its rotatable support, said pegs having a cylindrical portion to engage in said holes adjacent each hole end, and having a reduced portion carrying a radially bulging friction spring inside said holes.

3. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements, the said switches comprising stacks of insulated resilient spring arms provided with contacts, a plurality of the said stacks being arranged side by side, and predetermined actuated spring arms for each switch being extended beyond the other arms, and the said actuated arms for each station being joined together by said actuating member.

4. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements, the said switches comprising stacks of insulated resilient spring arms provided with contacts, a plurality of the said stacks being arranged side by side, and predetermined actuated spring arms for each switch being extended beyond the other arms, and the said actuated arms for each station being joined together by said actuating member, said actuating member comprising an insulating bar having a forward extension carrying said camming surfaces.

5. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switch controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements, said selector having rearwardly extending pins and said latter two means comprising a rotatable wheel with grooves and camming surfaces to rotate the selector by driving said pins.

6. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction during the periods of time between its step by step movements, said selector having rearwardly extending pins and said latter two means comprising a rotatable wheel with grooves and camming surfaces to rotate the selector by driving said pins, the said wheel stopping between the pins, and being of substantially the same thickness as the space between the pins, to hold the selector positively in its successive positions.

7. A station selector and tuner for a radio receiver, comprising a support, a multi-stage radio receiver carried by said support, a fixed trimmer condenser for each radio station and for each stage of the receiver, each condenser being connected in circuit with one of the receiver stages and with a station switch, a common actuating member for actuating all of the switches controlling the trimmer condenser for the various stages for each station, said actuating member being laterally beveled to provide a camming surface, said receiver including a speaker carried by said support, and said speaker registering with an opening in an annular station selector member, means carried by said support for rotatably supporting said annular selector member for rotation about a horizontal axis, said selector member having a ring of holes through it for each station and a hole in each ring for each quarter hour of the day, a plurality of headed pegs mounted in said holes and projecting backwardly from said annular selector member in position to engage predetermined common switch actuating members at their lateral camming surfaces as the annular selector member rotates, each peg actuating a predetermined common actuating member at the beginning of a predetermined quarter hour period, means for rotating the annular selector member step by step at the end of each quarter hour through an arc equivalent to one quarter hour on the annular selector member, and means for positively holding the annular selector member from moving in either direction through the periods of time between its step by step movements, said selector having rearwardly extending pins and said latter two means comprising a rotatable wheel with grooves and camming surfaces to rotate the selector by driving said pins, and a magnetically actuated pawl and ratchet for rotating said wheel step by step.

JOHN LOLLI.
GENE PAPITTO.

REFERENCES CITED

The following references are of record in the file of this patent:

UNITED STATES PATENTS

| Number | Name | Date |
|---|---|---|
| 2,085,624 | Allen | June 29, 1937 |
| 2,145,973 | Clayson | Feb. 7, 1939 |
| 2,175,561 | Fritz | Oct. 10, 1939 |
| 2,234,668 | Davenport | Mar. 11, 1941 |
| 2,332,767 | Wagner | Oct. 26, 1943 |
| 2,337,568 | Owens | Dec. 28, 1943 |